(No Model.)
S. UDSTAD & R. RYAN.
ROD PACKING.
No. 454,093. Patented June 16, 1891.
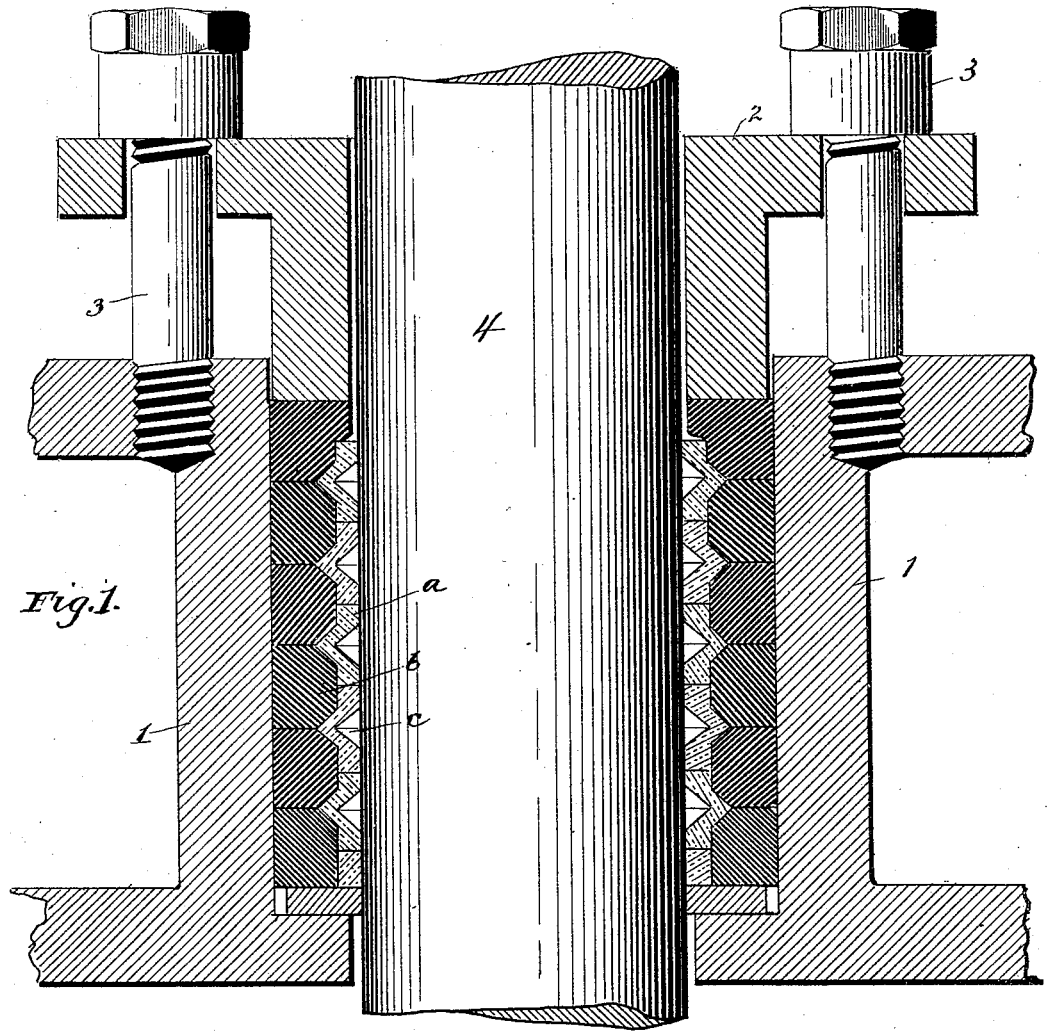
Witnesses:
Inventors
Sivert Udstad
and
Rafael Ryan
By John J. Halsted & Son their Attys.

UNITED STATES PATENT OFFICE.

SIVERT UDSTAD AND RAFAEL RYAN, OF AURORA, ILLINOIS.

ROD-PACKING.

SPECIFICATION forming part of Letters Patent No. 454,093, dated June 16, 1891.

Application filed November 20, 1890. Serial No. 372,035. (No model.)

*To all whom it may concern:*

Be it known that we, SIVERT UDSTAD and RAFAEL RYAN, both of Aurora, in the county of Kane and State of Illinois, have invented certain new and useful Improvements in Packing for Piston-Rods, Valve-Stems, &c.; and we do hereby declare that the following is a full, clear, and exact description of the invention, which will enable others skilled in the art to which it appertains to make and use the same, reference being had to the accompanying drawings, and to letters and figures of reference marked thereon, which form a part of this specification.

Our invention relates to a novel construction of the packing-rings, to the backing for the same, and to the disposing or placing of the rings and backing relatively to each other, the whole constituting a flexible or elastic and yet perfectly tight packing.

In the drawings, Figure 1 shows in section a stuffing-box with our improved devices therein applied to the piston rod or stem; Fig. 2, a plan of the metal ring with the rubber or elastic ring in place, and Fig. 3 a fragmentary detail showing the effect of compression of the metal rings.

1 represents a stuffing-box; 2, its gland; 3, the tightening-bolts, and 4 a piston or other rod. $a$ indicates rings, preferably of Babbitt metal, and which are made with grooves or cavities $c$ on their inner side, of an angular form in cross-section, as shown, and which facilitates their being compressed when necessary and their binding directly on the rod. Their outer sides have two meeting inclines $c'$ $c''$ and two flat portions $c'''$ $c'''$ beyond these inclines.

The elastic packing $b$, which may be of rubber, is solid and substantially square in cross-section, except that two corners of the square are beveled or inclined, as shown at $b'$, to conform to the inclines $c'$ $c''$ of adjacent rings.

The rings are not endless, but are open or severed, so that their ends nearly touch, as shown at $d$, and each ring is so laid upon its next adjacent one that its joint at $d$ will be overlapped by the solid metal of its next ring. This insures that the joints shall be steam-tight and water-tight.

The backing-rings $b$, inasmuch as they fill out entirely the space outside of the metallic rings, also insure that the packing shall be tight at those parts or places.

Of course it will be understood that the tightening of the bolts whenever the packing shall have become worn enough to leak forces inward the gland, causing the inside diameter of the rings $a$ to be decreased by pressing or binding closer together the parts which constitute its angle, as plainly shown in Fig. 3.

The elastic backing $b$ serves to keep the rings closed and tight all around; yet if in action any undue pressure should be exerted sidewise these elastic rings will accommodate themselves and thus contribute to produce what is wanted—a flexible or yielding and yet perfectly tight packing.

It will be observed that as the annular groove $c$ is in the inner side of the rings any compression of these rings forces the ring directly inward against the rod, and as the close-fitting of the rod is essential this is an important feature.

We claim—

1. The severed metal packing-rings $a$ as made with two flat interior surfaces to contact with the rod and with an annular groove between such surfaces, and whose sides or faces meet centrally of the ring, and also having at its outer side two flat surfaces and two inclined faces extending therefrom and centrally meeting each other.

2. In combination with the metal rings having the two interior flat faces and the described groove between them, and also having the two exterior flat faces and the rib with the double incline between them, solid elastic rings $b$, adapted to fill completely the space between the outer faces of the ring and the inner wall of the stuffing-box.

3. In combination with the metal rings $a$, having their interior and exterior surfaces each made with double inclines meeting flat surfaces, solid elastic packing-rings $b$, having beveled corners adapted to conform to the outer inclines $c'$ $c''$ of two adjacent rings $a$, and an intermediate flat surface serving to cover the joint between the metal rings, all as shown and described.

SIVERT UDSTAD.
RAFAEL RYAN.

Witnesses:
E. T. PRINDLE,
J. C. BEEDE.